United States Patent
Oh et al.

(10) Patent No.: US 10,107,956 B2
(45) Date of Patent: Oct. 23, 2018

(54) LIGHT GUIDE BAR AND BACKLIGHT DEVICE WITH THE SAME

(71) Applicant: Heesung Electronics Ltd., Daegu (KR)

(72) Inventors: Tae Geun Oh, Gyeongsangnam-do (KR); Young Wook Song, Daegu (KR)

(73) Assignee: Heesung Electronics Ltd., Daegu (KR)

( * ) Notice: Subject to any disclaimer, the term of this patent is extended or adjusted under 35 U.S.C. 154(b) by 539 days.

(21) Appl. No.: 14/425,907

(22) PCT Filed: Aug. 27, 2013

(86) PCT No.: PCT/KR2013/007670
§ 371 (c)(1),
(2) Date: Mar. 4, 2015

(87) PCT Pub. No.: WO2014/038807
PCT Pub. Date: Mar. 13, 2014

(65) Prior Publication Data
US 2015/0234119 A1 Aug. 20, 2015

(30) Foreign Application Priority Data

Sep. 5, 2012 (KR) .................. 10-2012-0098019
Jan. 15, 2013 (KR) .................. 10-2013-0004325

(51) Int. Cl.
*F21V 7/04* (2006.01)
*F21V 8/00* (2006.01)

(52) U.S. Cl.
CPC .................. *G02B 6/0096* (2013.01)

(58) Field of Classification Search
USPC ........................................ 362/551
See application file for complete search history.

(56) References Cited

U.S. PATENT DOCUMENTS

2009/0052204 A1* 2/2009 Kawashima ......... G02B 6/0078
362/555

FOREIGN PATENT DOCUMENTS

JP 2002098838 A 4/2002
JP 2003022705 A 1/2003
(Continued)

OTHER PUBLICATIONS

"Related International Application No. PCT/KR2013/007670", "International Search Report", dated Dec. 11, 2013, Publisher: ISR/KR KIPO, Published in: KR.

*Primary Examiner* — Rafferty Kelly
(74) *Attorney, Agent, or Firm* — Kaplan Breyer Schwarz, LLP

(57) ABSTRACT

A light guide bar for improving external characteristics by inducing light projection through side surfaces. The light guide bar comprises: a main body in the shape of a bar having a predetermined length; a light incident surface to which light is incident from one side end portion in the lengthwise direction of the main body; a reflection surface for reflecting the incident light from the light incident surface to the inside of the main body; a projection surface for projecting the incident light from the light incident surface to the outside of the main body; and a light extraction pattern formed on the projection surface. The light guide bar, as configured above, induces the projection of light through the light projection surfaces at both side surfaces such that a dark area between the light guide bars can be removed in a backlight device so as to improve external characteristics.

7 Claims, 17 Drawing Sheets

(56) References Cited

FOREIGN PATENT DOCUMENTS

| | | | |
|---|---|---|---|
| JP | 2003162914 | A | 6/2003 |
| JP | 2003331627 | A | 11/2003 |
| KR | 20100103736 | A | 9/2010 |

* cited by examiner

LIGHT GUIDE BAR AND BACKLIGHT DEVICE WITH THE SAME

FIELD OF THE INVENTION

The present invention relates to a light guide bar, and more particularly, to a light guide bar capable of improving appearance characteristics by inducing light emission to side surfaces, and a backlight device including the same.

BACKGROUND OF THE INVENTION

In recent times, a backlight device in which an LED light source is disposed at side sections of a light guide body having a bar shape is disclosed. FIG. 1 is an exploded perspective view showing a backlight device of the related art, and FIG. 2 is a perspective view showing a light guide bar serving as a major part of FIG. 1. The backlight device using the light guide bar of the related art includes a reflection plate 20 and a plurality of light guide bars 30 disposed in a cover bottom 10 at equal intervals, and LEDs 40 serving as light sources disposed at both side sections of the light guide bar 30. A diffusion plate 50 and various optical sheets 60 are disposed over the light guide bar 30. A guide panel 70 is fastened to the cover bottom 10.

The light guide bars 30 have one side surface or both side surfaces in a longitudinal direction thereof that constitute a light incident surface through which light of the LED 40 enters, and an upper surface and both side surfaces that constitute a light emission surface through which light is emitted. Lower surfaces of the light guide bars 30 constitute a reflection surface configured to reflect light scattered therein upward. A light reflection pattern 31 configured to efficiently reflect light to improve brightness is formed at the lower surface.

However, the light guide bar 30 having such a structure concentrates most of the light to the upper surface due to the light reflection pattern 31 formed at the lower surface and emits the concentrated light. In this case, while optical characteristics over the light guide bar 30 have high brightness in a region in which the light guide bar 30 is disposed, a relative dark area is generated in a space between the light guide bars 30. This difference in light and shade according to a position of the light guide bar 30 may cause a decrease in optical characteristics such as the entire brightness of the backlight device, brightness uniformity, and so on.

In particular, the decrease in appearance caused by the light guide bar becomes serious as the backlight device is slimmed in recent times. In order to prevent this, while a method of narrowing a gap between the light guide bars 30 is proposed, in this case, a relatively large number of light guide bars 30 are used to increase manufacturing costs and power consumption of the backlight device. In addition, while a method of increasing a gap between the light guide bar 30 and the diffusion plate 50 is also provided, brightness is decreased and slimming of the backlight device is prohibited.

SUMMARY OF THE INVENTION

In order to solve the problems, an object of the present invention is to provide a light guide bar capable of improving appearance characteristics by removing a dark area between light guide bars, and a backlight device including the same.

Another object of the present invention is to provide a light guide bar capable of reducing manufacturing costs and further reducing a thickness of a backlight device using a relatively small number of light guide bars on the same area, and a backlight device including the same.

Still another object of the present invention is to provide a backlight device capable of relatively increasing an effective emission region by minimizing a bezel region.

In order to achieve the aforementioned objects, a light guide bar of the present invention includes a light guide main body having a bar shape with a certain length; a light incident surface into which light enters from at least one end of the light guide main body in a longitudinal direction; a reflection surface configured to reflect light entering from the light incident surface into the light guide main body; a light emission surface configured to emit the light entering from the light incident surface to the outside of the light guide main body; and a light extraction pattern formed at the light emission surface.

Here, the light guide main body may have a cross-section in a progress direction of light formed in a quadrangular shape or a hemispherical shape.

The light extraction pattern may be formed at both side surfaces only of the light guide main body having a quadrangular cross-section, or formed at both side surfaces and an upper surface, the light guide main body may be formed in a separation type in which a central section is separated, and the light guide main body may have a plane formed at an end of the central section in a curved shape or a polygonal shape. In addition, the light guide main body may include: an extension section extending from an upper surface of an end of the central section; a space section provided under the extension section; and a light scattering pattern formed at an upper surface of the extension section.

The light extraction pattern may be formed in a ring shape through embossing or engraving along a hemispherical shape of the light guide main body having a hemispherical shape cross-section, the light extraction pattern may have a shape having a size increased from a central section of an upper surface toward both side sections of the light emission surface, the light extraction pattern may be controlled with respect to a surface curve of the light guide main body defined as $$\frac{X^2}{a^2} + \frac{y^2}{b^2} = 1$$

(here, a and b are radii of a major axis and a minor axis), an embossed light extraction pattern may be controlled according to a surface curve by Mathematical Equation defined as $$\frac{X^2}{a_1^2} + \frac{(y+c_1)^2}{b_1^2} = 1$$

(here, $a_1 > a$, $b_1 > b$, and $c_1 > (b_1 - b) > 0$), and an engraved light extraction pattern may be controlled according to a surface curve by Mathematical Equation defined as $$\frac{X^2}{a_2^2} + \frac{(y-c_2)^2}{b_2^2} = 1$$

(here, $a_2 < a$, $b_2 < b$, and $c_2 > (b - b_2) > 0$).

A backlight device of the present invention includes a cover bottom; a plurality of light guide bars disposed in the cover bottom, each comprising a light guide main body having a bar shape with a certain length, a light incident surface into which light enters from at least one end of the light guide main body in a longitudinal direction, a reflection surface configured to reflect light entering from the light incident surface into the light guide main body, a light emission surface configured to emit the light entering from the light incident surface to the outside of the light guide main body, and a light extraction pattern formed at the light emission surface; a light source disposed at the light incident surface of the light guide bar to cause light to enter the light guide bar; a light control member disposed over the light guide bar; and a fixing grip configured to press both side surfaces of the light guide main body to fix the light guide main body to the cover bottom, wherein the light guide main bodies are formed in a separation type in which a central section is separated, and are disposed in a zigzag on the same line in a longitudinal direction, the light incident surface of the light guide bar is fixed to the cover bottom, and a pupillary light surface side is assembled to be thermally expanded.

According to the light guide bar having the above-mentioned configuration, as light emission is induced to both light emission surfaces, the dark area between the light guide bars can be removed from the backlight device to improve appearance characteristics.

In addition, even when the backlight device of the present invention uses a relatively small number of light guide bars, brightness and uniformity characteristics can be improved to reduce manufacturing costs and a thickness thereof.

The backlight device of the present invention can increase an effective emission region by minimizing the bezel region.

DETAILED DESCRIPTION

Hereinafter, an exemplary embodiment of the present invention will be described in detail with reference to the accompanying drawings.

Figure 1:
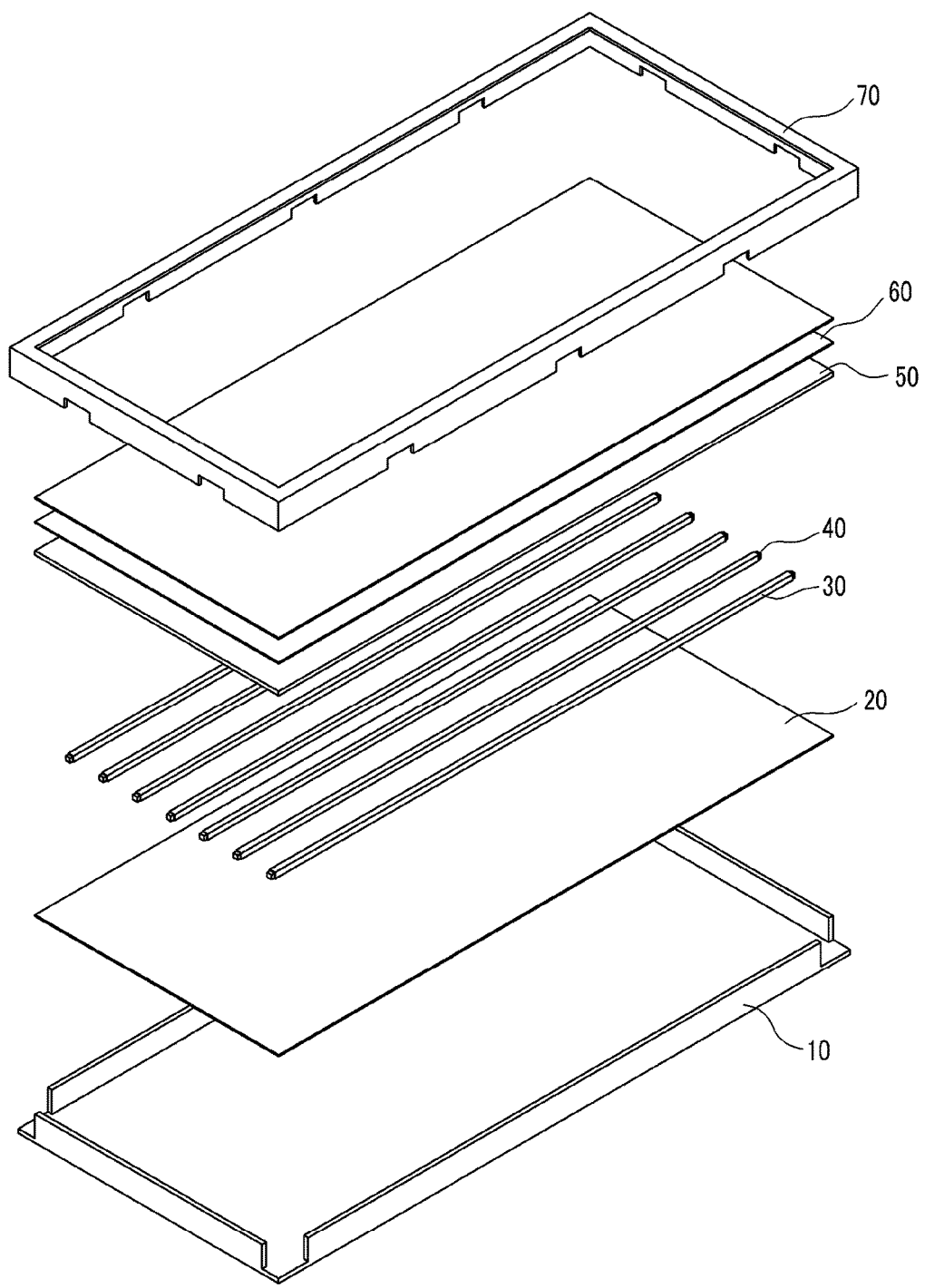
FIG. 1 is an exploded perspective view showing a backlight device of the related art.
Figure 2:
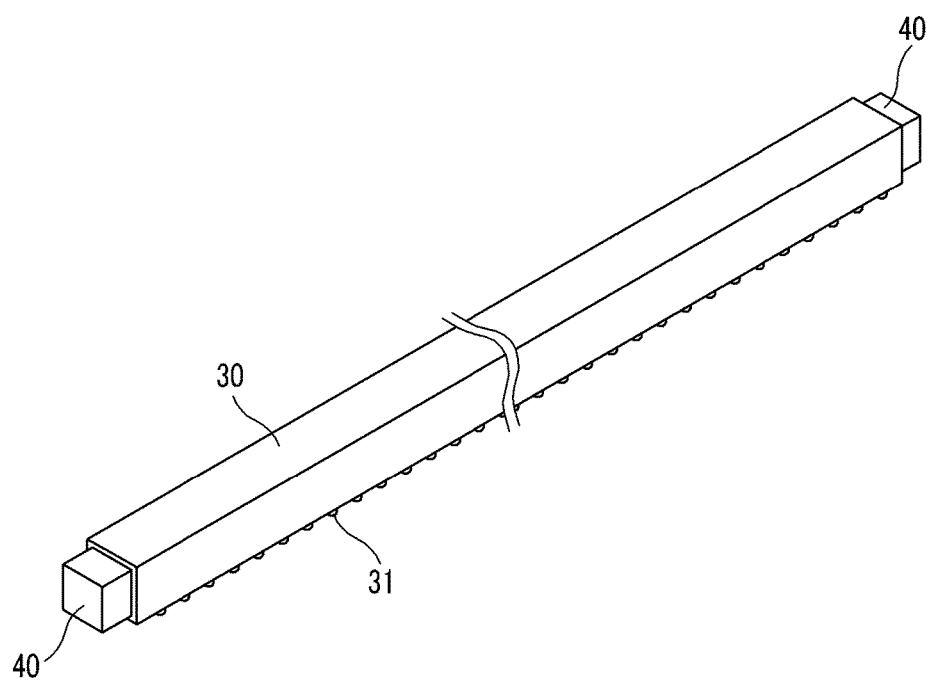
FIG. 2 is an enlarged perspective view of a light guide bar of FIG. 1.
Figure 3:
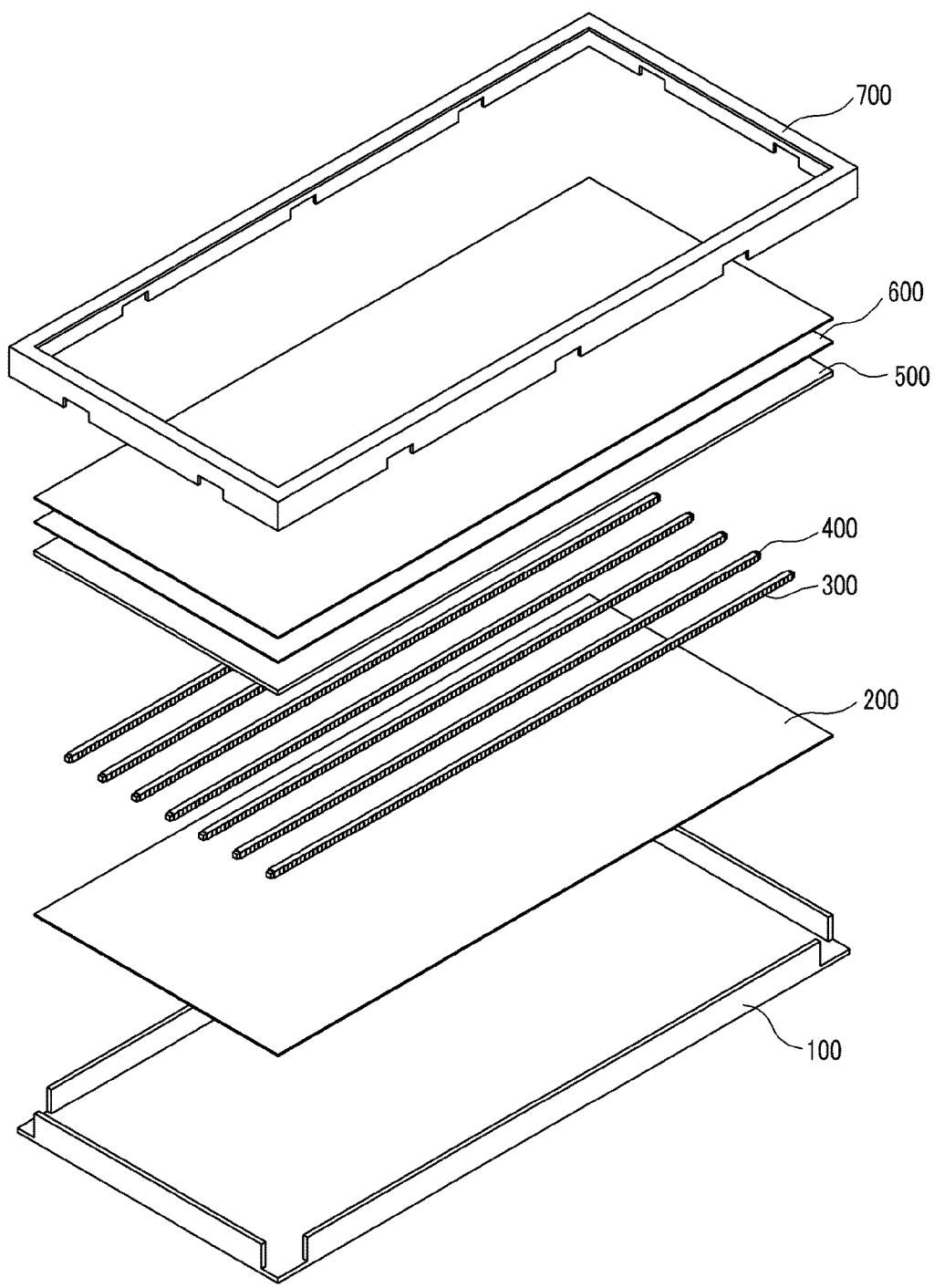
FIG. 3 is an exploded perspective view of a backlight device according to the present invention.

FIG. 3 is an exploded perspective view of a backlight device according to the present invention. As shown, the backlight device includes a reflection surface 200 and a plurality of light guide bars 300 disposed in a cover bottom 100. LED light sources 400 are installed at both sides of the light guide bar 300, and a diffusion plate 500 and an optical sheet 600 are disposed on the light guide bar 300. A guide panel 700 is fastened to the cover bottom 100.

The light guide bar 300 has a bar shape having a predetermined length, and side surfaces of both ends form a light incident surface through which light enters. The light incident surface can be formed on both side surfaces or only one side surface thereof according to disposition of the LED light source 400. The light incident surface is configured to receive light from the LED light source 400 to totally reflect the light in the light guide bar 300.

A lower surface of the light guide bar 300 forms a reflection surface configured to reflect light leaking downward into the light guide bar 300. The reflection surface increases brightness by reflecting and scattering the light leaking from the lower surface thereinto.

An upper surface and both side surfaces of the light guide bar 300 form a light emission surface through which light is emitted. The light emission surface emits the light dispersed into the entire region of the light guide bar 300 to an upper section or side sections. The light emitted through the light emission surface is emitted toward a linear light source according to a shape of the light guide bar 300. That is, the light guide bar 300 of the present invention functions as an optical transducer configured to switch light of a point light source emitted from the LED light source 400 to a linear light source.

Figure 4A:
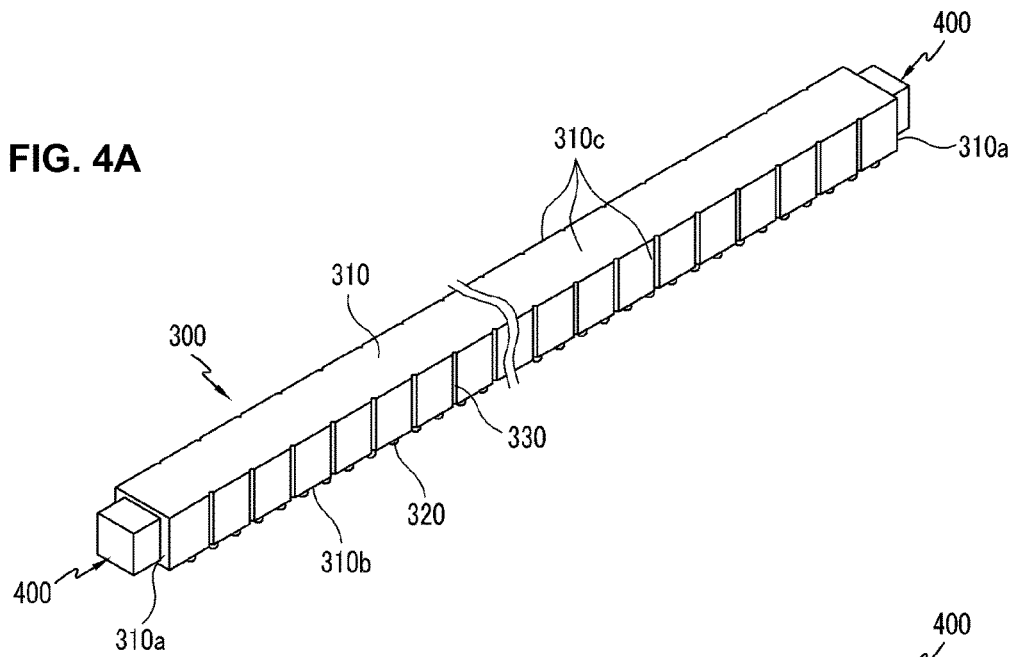
FIG. 4 is an enlarged perspective view showing a first embodiment of a light guide bar of the present invention.
Figure 4B:
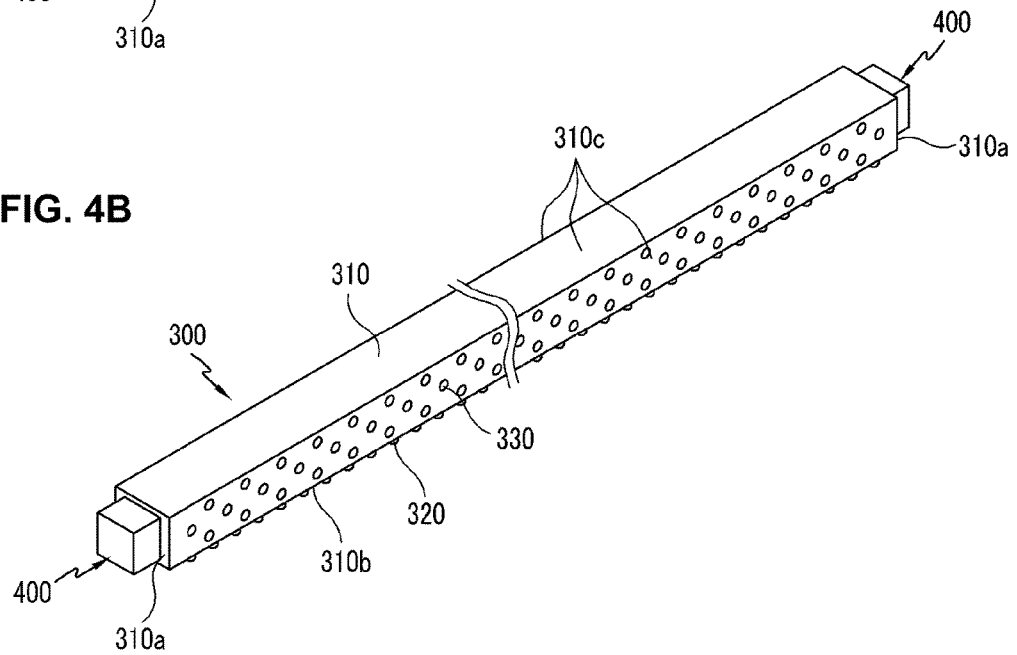
Figure 5A:
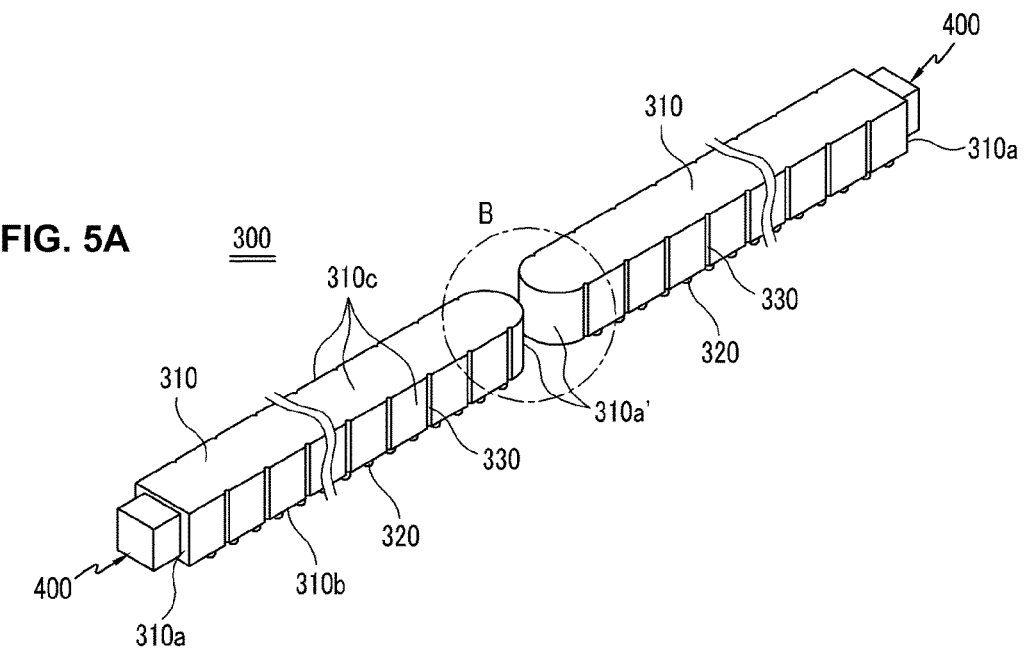
FIG. 5 is an enlarged perspective view showing a second embodiment of the light guide bar of the present invention.
Figure 5B:
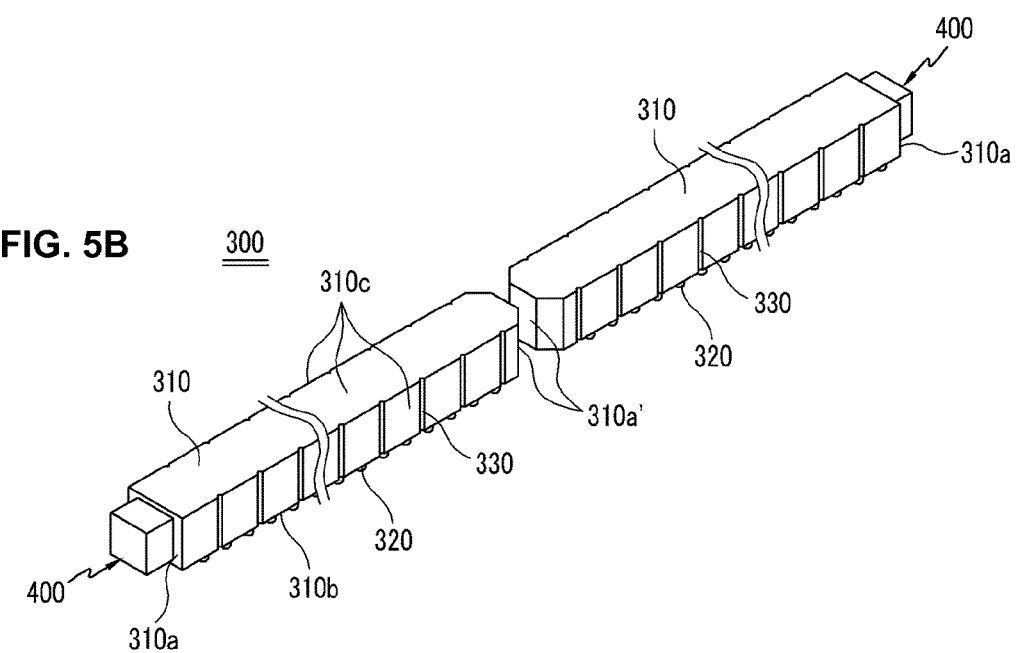

FIGS. 4 to 6 are views showing first and second embodiments of the light guide bar of the present invention. The light guide bar 300 of FIG. 4 includes a light guide main body 310 having a quadrangular cross-section, a light reflection pattern 320 formed at a lower surface of the light guide main body 310, and light extraction patterns 330 formed at left and right side surfaces of the light guide main body 310. The light guide main body 310 may be formed of a transparent resin such as PMMA. The light of the point light source entering a light incident surface 310a by the light guide main body 310 having a bar shape is totally reflected along the inside of the light guide main body 310 to be switched to the linear light source to be emitted to a light emission surface 310c.

The light reflection pattern 320 reflects the light leaking downward into the light guide main body 310, and efficiently scatters the reflected light in the light guide main body 310. The light reflection pattern 320 may be an optical pattern such as a prism pattern or a dot pattern, or may be a reflection layer on which paste of a reflective material is printed.

The light extraction pattern 330 induces the light to be emitted to the side surfaces of the light guide main body 310. That is, the light extraction pattern 330 induces the light entering from both ends in the longitudinal direction to be emitted toward both side surfaces. Accordingly, a sufficient amount of light can be distributed in an empty space between the plurality of light guide bars 300 arranged by the pattern. The light extraction pattern 330 may be formed in a prism pattern like (a) or a dot pattern like (b). The light extraction pattern 330 may be formed to have a gap reduced as being spaced apart from the light source. The light extraction pattern 330 may be embossed or engraved from the surface of the light guide main body 310, and may be formed only on both side surfaces or further on an upper surface.

The light guide bar 300 of FIG. 5 is constituted by the pair of light guide main bodies 310, a central section of which is separated. Each of the light guide main bodies 310 has an outer end at which the LED light source 400 is disposed to form the light incident surface 310a, and an inner end at which a pupillary light surface 310a' is formed. Here, a plane of an inner end B may have a quadrangular shape, a curved shape, or a polygonal shape. Such a curved or polygonal shape can prevent a hot spot phenomenon due to concentration of light from being generated at a vertical angle section perpendicular to a corner in the quadrangular shape.

Figure 6A:
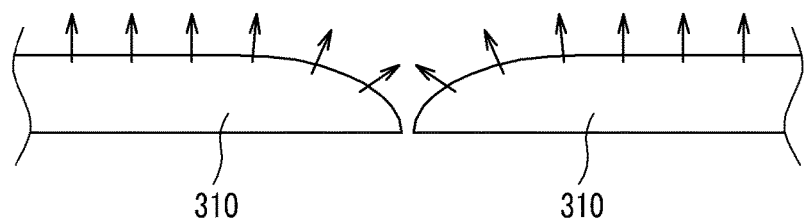
FIG. 6 is a side view showing variants in which ends of the light guide bars of FIG. 5 are various modified.
Figure 6B:
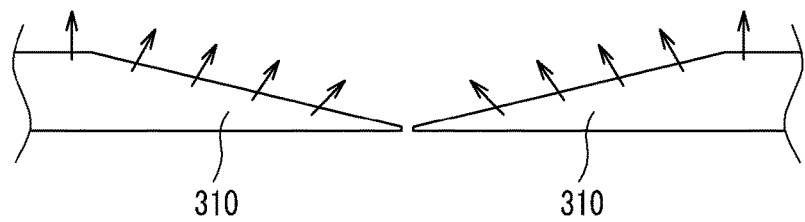
Figure 6C:
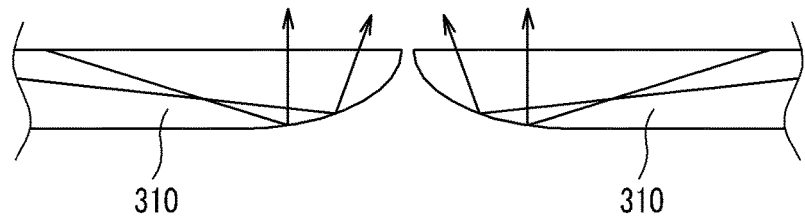
Figure 6D:
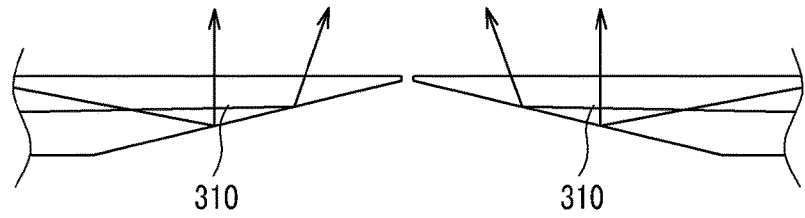

The light guide main body 310 may have the inner end B having various shapes. As shown in FIG. 6(a), the upper side surface may have a spherical surface or a non-spherical surface, or as shown in FIG. 6(b), may have an inclined surface. In addition, as shown in FIG. 6(c), the lower side surface may have a spherical surface or a non-spherical surface, or as shown in FIG. 6(d), may have an inclined surface. These shapes prevent a decrease in optical characteristics due to a hot spot or the like at a side end of the pupillary light surface of the light guide main body 310. The light guide main body 310 may have a wedge shape having a thickness reduced as being spaced apart from the light source such that uniform light can be emitted throughout the entire length.

Figure 7A:
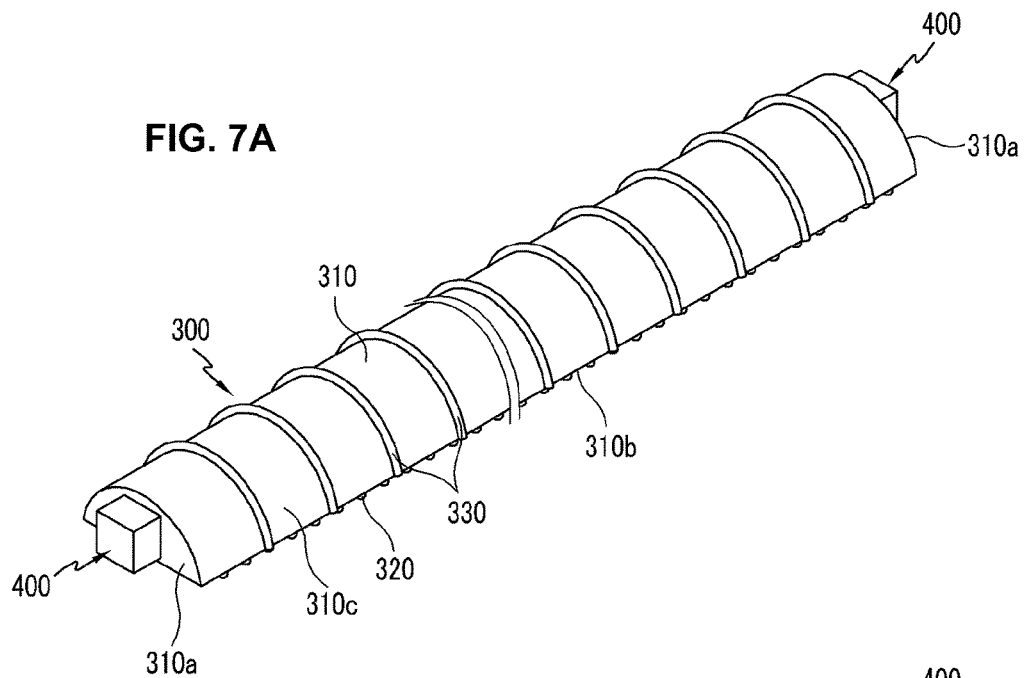
FIG. 7 is an enlarged perspective view showing a third embodiment of the light guide bar of the present invention.
Figure 7B:
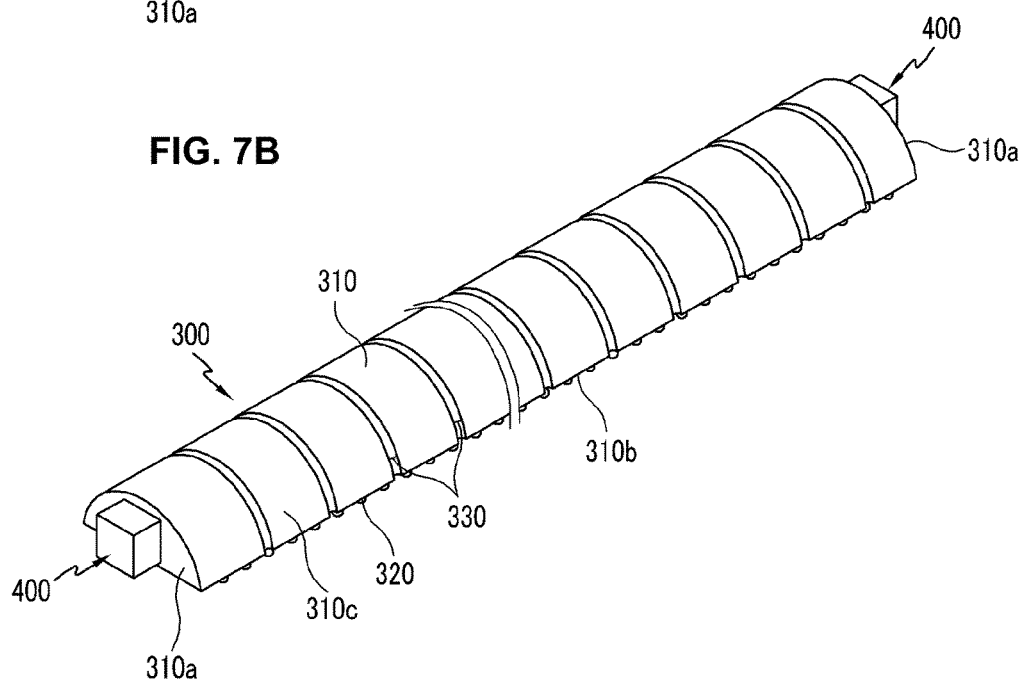
Figure 8A:
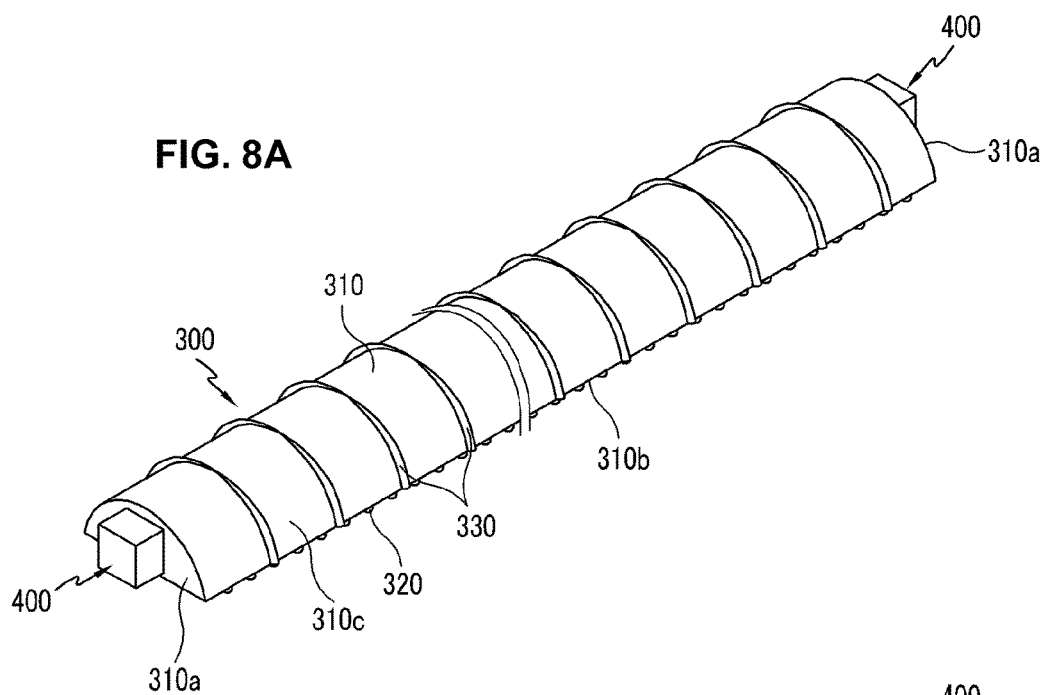
FIG. 8 is an enlarged perspective view showing a fourth embodiment of the light guide bar of the present invention.
Figure 8B:
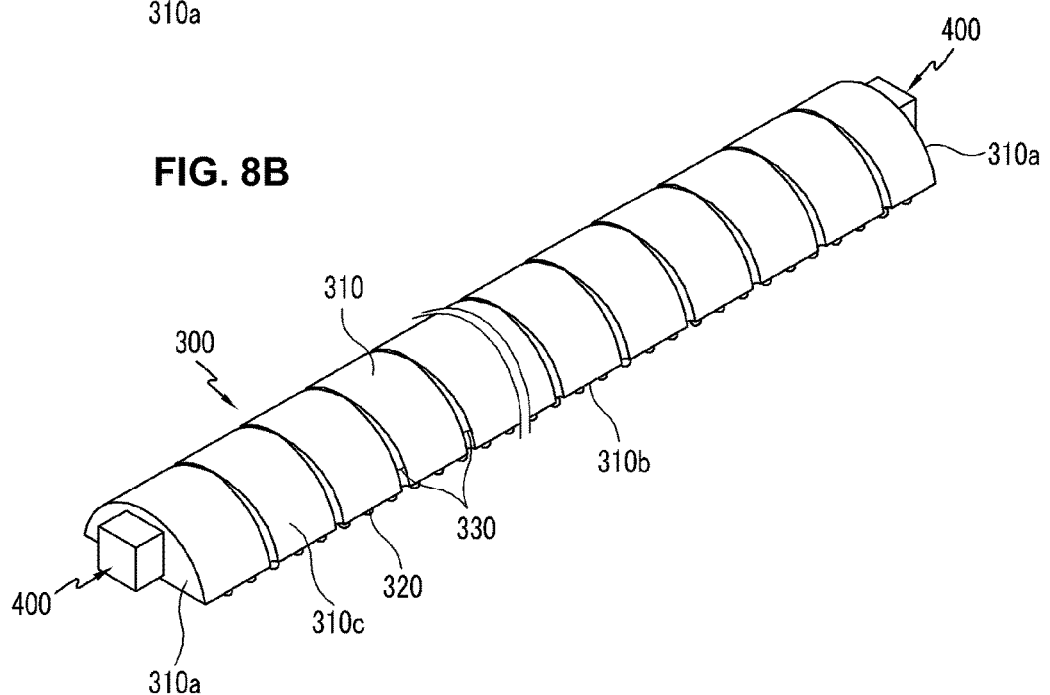

FIGS. 7 to 9 are views showing third and fourth embodiments of the light guide bar of the present invention. The light guide bar 300 of FIGS. 7 and 8 is constituted by the light guide main body 310 having a hemispherical cross-section, and the light extraction pattern 330 formed at the light emission surface 310c of the light guide main body 310. The light guide main body 310 has an upper section and side sections that form a circular or oval hemi-spherical surface, and the hemi-spherical surface forms the light emission surface 310c through which light is emitted. The light emission surface 310c having such a shape is configured to uniformly emit light radially with respect to an xz plane.

The light extraction pattern 330 is formed on a surface of the light guide main body 310 in a ring shape through embossing or engraving. The light extraction patterns 330 are formed in a longitudinal direction of the light guide main body 310 at predetermined intervals and formed along a surface of a cross-section of the light emission surface 310c (i.e., an xz direction). The light extraction pattern 330 having such a shape is configured to uniformly emit light with respect to an yz plane of the light emission surface 310c. The light extraction pattern 330 of FIG. 7 is formed in the same shape at a central section of an upper surface and both side sections of a lower surface of the light guide main body 310. The plurality of light extraction patterns 330 may be formed at equal intervals or may be formed at intervals reduced as being spaced apart from the light source. In addition, the light extraction pattern 330 may have various cross-sectional shapes such as a round shape, a prism shape, or a prism shape with a round apex angle.

The light extraction pattern 330 of FIG. 8 may be formed in a shape varied from the central section of the upper surface of the light guide main body 310 toward the both side sections of the lower surface. The light extraction patterns 330 having a variable shape are formed to have a small width and height (or depth) at the central section and formed to have a width and height (or depth) gradually increased toward the both side sections. The light extraction patterns 330 having a variable shape are configured to induce a large amount of light to be emitted with respect to lower sections of both sides of the light emission surface 310c through which a relatively small amount of light is emitted, and uniformly emit the light with respect to the light emission surface 310c having a hemi-spherical surface.

As shown in FIG. 9, the light extraction patterns 330 having a variable shape can control a surface curve. Since the light guide main body 310 has an oval cross-section, an equation of the surface curve of the light guide main body 310 is defined as Mathematical Equation 1.

$$\frac{X^2}{a^2} + \frac{y^2}{b^2} = 1 \qquad \text{Mathematical Equation 1}$$

(Here, a and b represent radii of a major axis and a minor axis.)

Figure 9A:
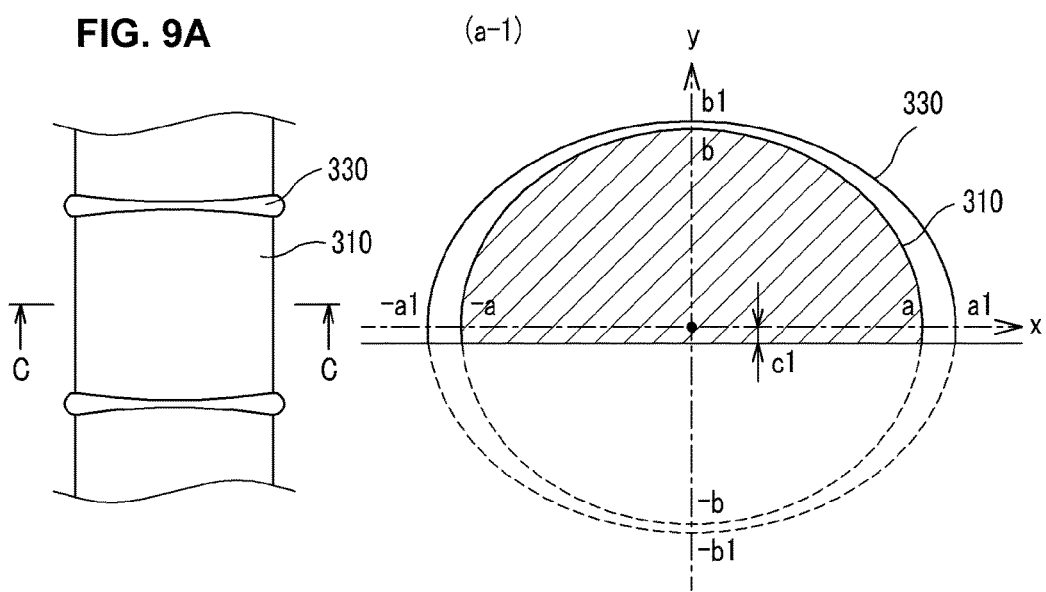
FIG. 9 is a partially enlarged view showing shapes of an embossed pattern and an engraved pattern of a light extraction pattern of the light guide bar of FIG. 8.

In the light guide main body 310 having the embossed light extraction pattern 330 as shown in FIG. 9(a), the surface of the light extraction pattern 330 has radii in x- and y-axes directions of $a_1$ and $b_1$ increased to be larger than the surface of the light guide main body 310 as shown in FIG. 9(a-1). Here, a vertical reference surface of the light guide main body 310 is increased by $c_1$. When the surface curve of the embossed light extraction pattern 330 is represented as an oval equation, the equation is defined as Mathematical Equation 2.

$$\frac{X^2}{a_1^2} + \frac{(y+c_1)^2}{b_1^2} = 1 \qquad \text{Mathematical Equation 2}$$

(Here, $a_1 > a$, $b_1 > b$, and $c_1 > (b_1 - b) > 0$.)

The light guide main body 310 having the embossed light extraction pattern 330 has a height increased to a value $c_1$ larger than a vertical height ($b_1$-b) of at least the light extraction pattern 330.

Figure 9B:
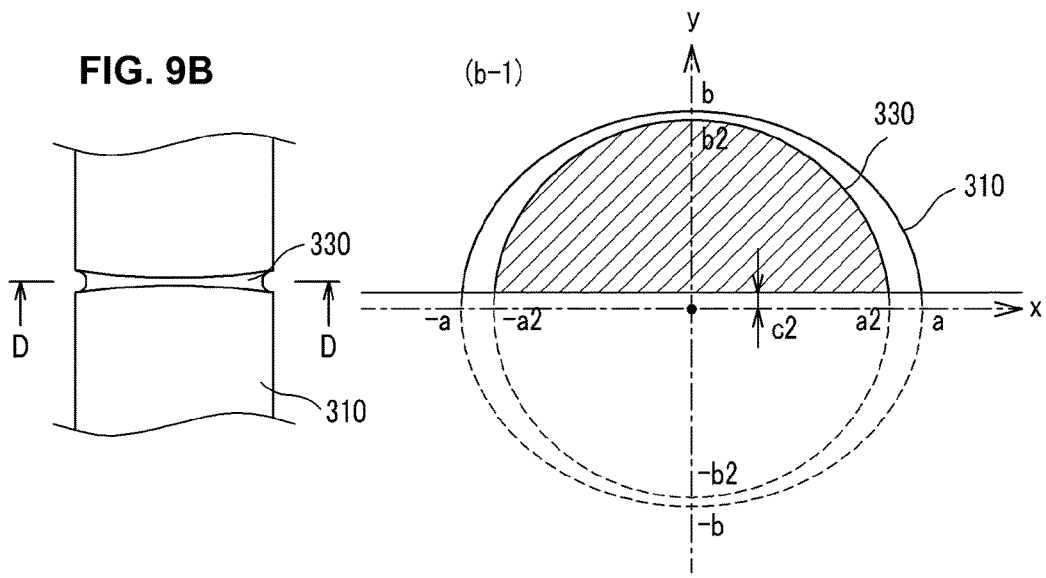

In the light guide main body 310 having the engraved light extraction pattern 330 as shown in FIG. 9b), the surface of the light extraction pattern 330 has radii in x- and y-axes directions of $a_2$ and $b_2$ reduced to be smaller than the surface of the light guide main body 310 as shown in FIG. 9 (*b*-1). Here, a vertical reference surface of the light guide main body 310 is reduced by $c_2$. When the surface curve of the engraved light extraction pattern 330 is represented as an oval equation, the equation is defined as Mathematical Equation 3.

$$\frac{X^2}{a_2^2} + \frac{(y-c_2)^2}{b_2^2} = 1 \quad \text{Mathematical Equation 3}$$

(Here, $a_2 < a$, $b_2 < b$, and $c_2 > (b-b_2) > 0$.)

The light guide main body 310 having the engraved light extraction pattern 330 is reduced to a height $c_2$ larger than a vertical height ($b$-$b_2$) of at least the light extraction pattern 330.

Eventually, as shown in FIG. 9, the height of the light guide main body 310 having an oval light emission surface is increased when the light extraction pattern 330 is formed through embossing, and decreased when formed through engraving.

Accordingly, in the light guide main body 310 having the oval light emission surface, a and b values are defined as a basic shape, and values of parameters $a_1$, $b_1$, $c_1$, $a_2$, $b_2$ and $c_2$ are adjusted to control a shape of the light extraction pattern 330.

Figure 10A:
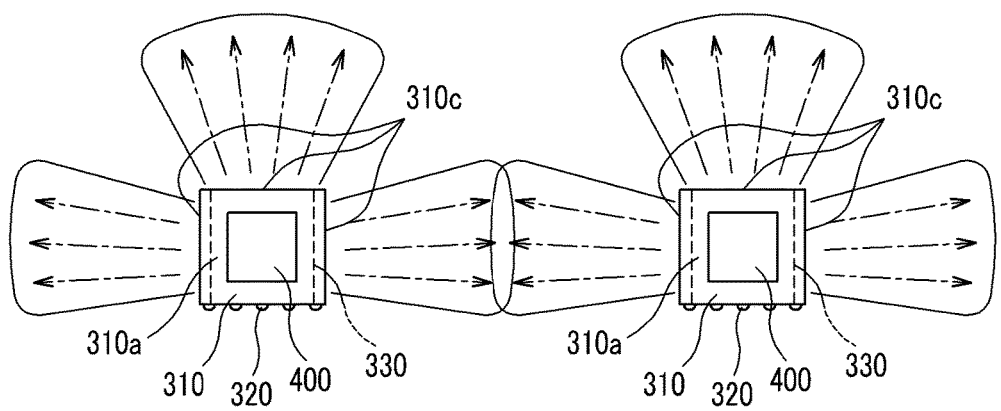
FIG. 10 is a view showing a light emission path of the light guide bar of the present invention.
Figure 10B:
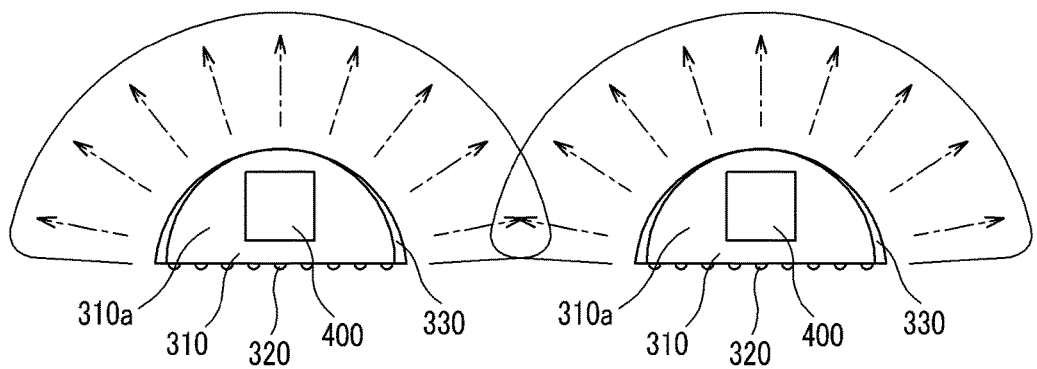
Figure 11A:
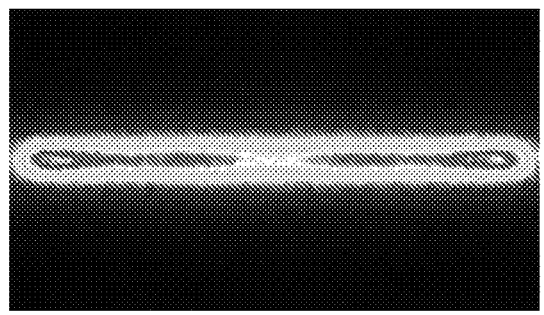
FIG. 11 is a photograph in which optical characteristics of the light guide bar of the present invention and the light guide bar of the related art are compared.
Figure 11B:
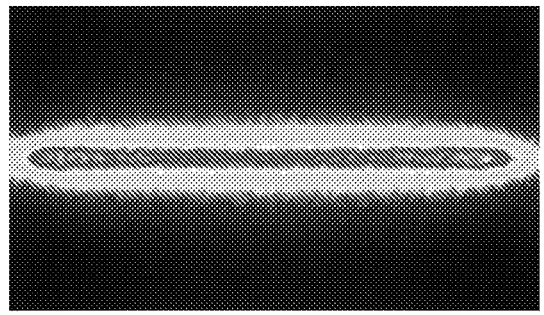
Figure 11C:
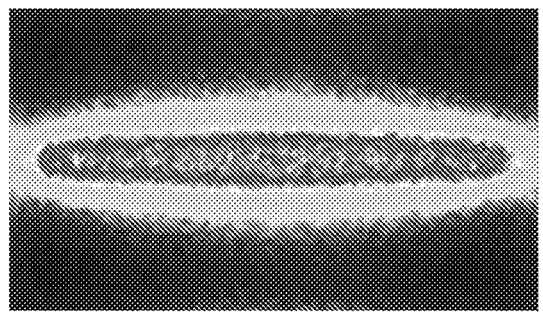
Figure 12A:
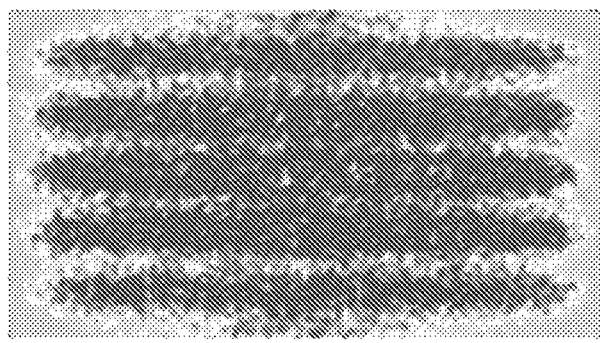
FIG. 12 is a photograph in which optical characteristics of the backlight device of the present invention and the backlight device of the related art are compared.
Figure 12B:
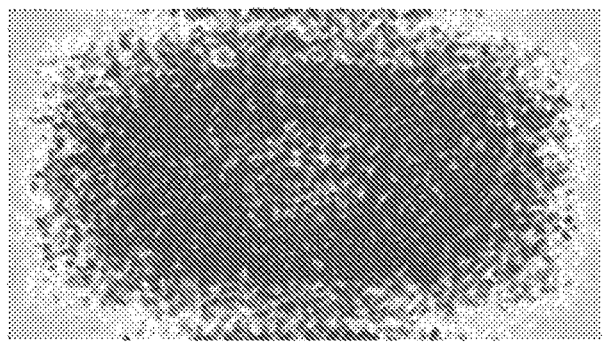

FIGS. 10 to 12 are views showing optical characteristics of the light guide bar and the backlight device of the present invention and the related art. As shown in FIG. 10(*a*), the light guide bar 300 having the light guidemainbody 310 in aquadrangular shape induces emission of the light toward both side sections by the light extraction patterns 330 formed at both side surfaces of the light emission surface 310*c*. As shown in FIG. 10(*b*), the light guide bar 300 having the light guide main body 310 in a hemispherical shape uniformly emits light by the light emission surface 310*c* and the light extraction pattern 330 having a hemispherical shape. Accordingly, a sufficient amount of light is distributed even in a space between the light guide bars 300 and thus prevents generation of a dark area between the neighboring light guide main bodies 310.

It can be confirmed that, as shown in FIG. 11(*a*), the light guide bar of the related art has low brightness at a central section far from the light source, and weak light is emitted through the side surface. However, it can be confirmed that, as shown in FIG. 11(*b*), the quadrangular light guide bar having a light emission pattern formed on the side surface has high brightness at the central section, and strong light is emitted through the side surface. This is because the light extraction pattern formed along the side surface of the light emission surface induces emission of the light to the both side sections of the light guide main body and simultaneously to the central section. In addition, it can be confirmed that, as shown in FIG. 11(*c*), the hemispherical light guide bar having the light extraction pattern having a ring shape with a variable size represents high brightness at the central section, and light of the linear light source having a largest width is emitted with respect to the entire light guide bar. This is because emission of a larger amount of light is induced to the both side sections and the central section by the light guide main body having the hemispherical light emission surface and the light extraction pattern having a size increased from an upper central section to both lower sections of the light emission surface.

In the backlight device of the related art and the present invention of FIG. 12, five light guide bars are disposed at intervals of 70 mm, one diffusion plate is stacked on the light guide bars, and optical characteristics of light emitted upward from the diffusion plate are shown. As shown in FIG. 12(*a*), in the backlight device of the related art, a relatively dark area is generated between the light guide bars to exhibit shapes of the linear light sources to degrade appearance of the backlight device. However, as shown in FIG. 12(*b*), in the backlight device of the present invention, high brightness is exhibited even between the light guide bars, the dark area is removed, and a shape of the linear light source is not exhibited to the outside.

Figure 13A:
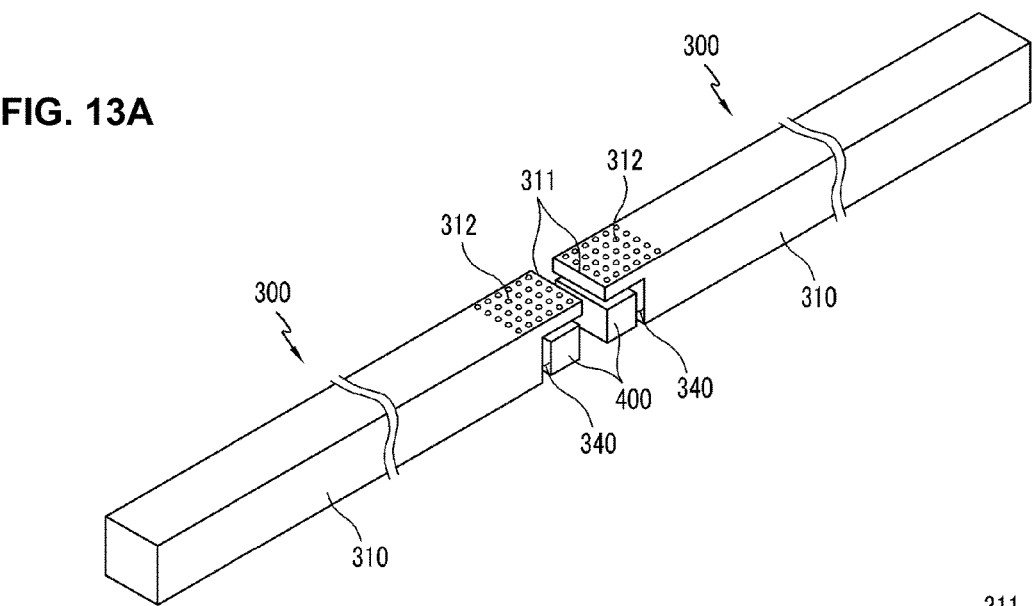
FIG. 13 is an enlarged perspective view showing fifth and sixth embodiments of the light guide bar of the present invention.
Figure 13B:
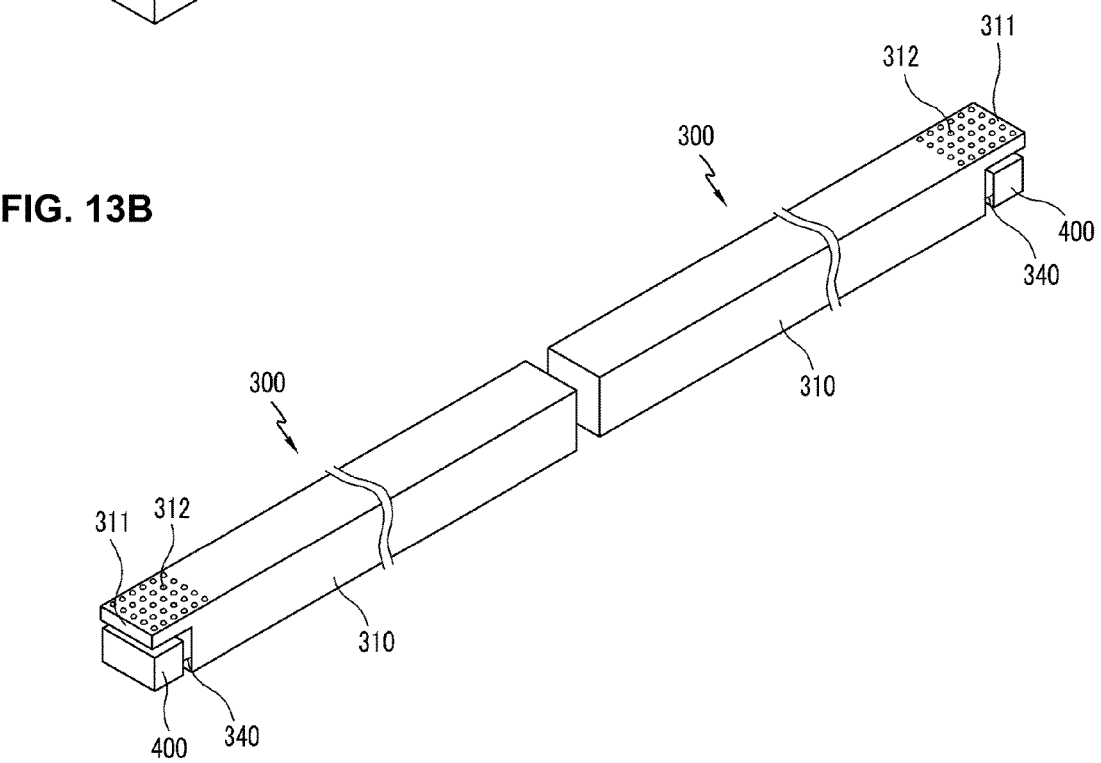
Figure 14:
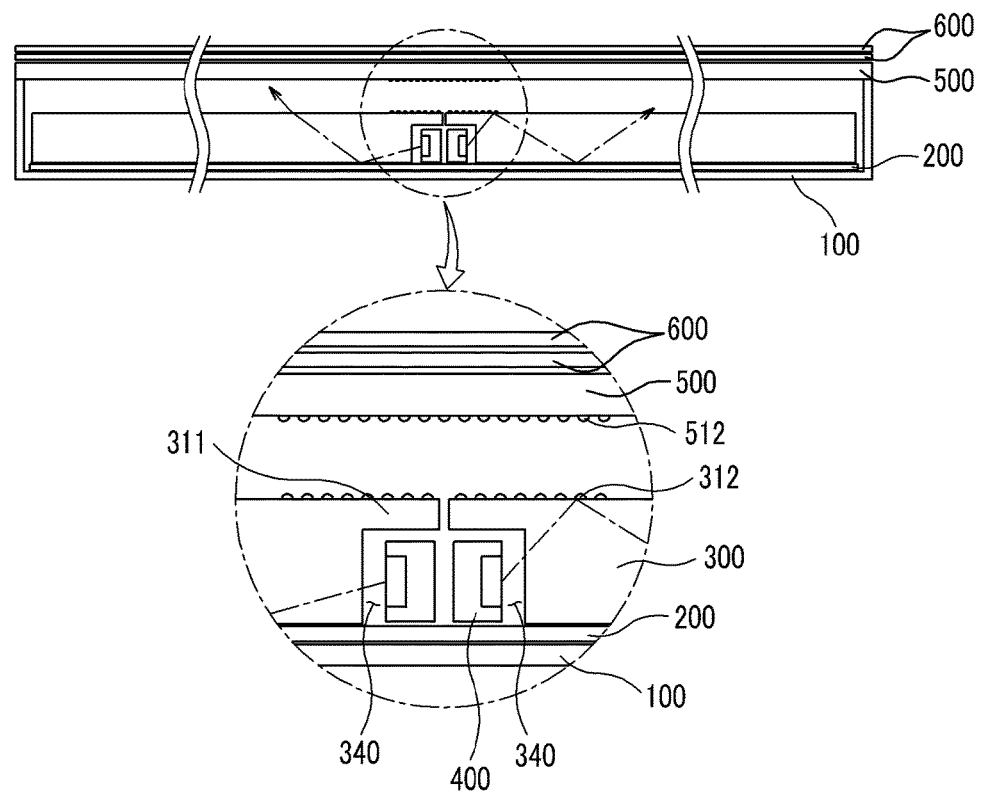
FIG. 14 is a cross-sectional view of the backlight device including the light guide bar of FIG. 13(a).

FIG. 13 is an enlarged perspective view showing fifth and sixth embodiments of the light guide bar of the present invention, and FIG. 14 is a cross-sectional view of the backlight device including the light guide bar of FIG. 13(*a*). The light guide bar 300 of FIG. 13 is constituted by the pair of the light guide main bodies 310, a central section of which is separated. In particular, the light guide main body 310 has a light source unit 340 at which the LED light source 400 is disposed, and an extension section 311 from which an upper surface of the light source unit 340 extends. The extension section 311 covers the LED light source 400 disposed at the light source unit 340 to prevent the light emitted from the LED light source 400 from being directly emitted upward. The light guide main body 310 has a light scattering pattern 312 formed at an upper surface of the extension section 311. The light scattering pattern 312 scatters a part of the light emitted to the surface of the light guide main body adjacent to the light source unit 340, and reflects a part of the light again into the light guide main body 310 to prevent generation of a hot spot in the light source unit 340. The light scattering pattern 312 may have various shapes such as a dot shape and so on, and may be formed at an upper light emission surface of the extension section 311 to have a larger width than a width of at least the light source unit 340 in the longitudinal direction.

The light guide main body 310 has the LED light source 400 disposed to be positioned at a center as shown in FIG. 13(*a*) orpositionedoutside as shown in FIG. 13(*b*). The LED light source 400 is covered by the extension section 311 of the light guide main body 310, and a hot spot due to the light source is prevented by the extension section 311 and the light scattering pattern 312 formed at the upper surface of the extension section 311. Accordingly, since the backlight device to which the light guide bar 300 is applied does not require a separate structure or a bezel region configured to cover the light source unit, it is advantageous to implement a large-area backlight device.

The backlight device of FIG. 14 has a light scattering pattern 512 formed at a lower surface of the diffusion plate 500. The light scattering pattern 512 of the diffusion plate 500 may have various shapes such as a dot shape and so on. The light scattering pattern 512 is formed to have a larger width than a width of the light source units 340 of at least both sides of the central section at which the LED light source 400 is disposed. The light scattering pattern 512 may be formed while varying a shape and density as the LED light source 400 of a center is moved from a central position toward the outside.

Figure 15:
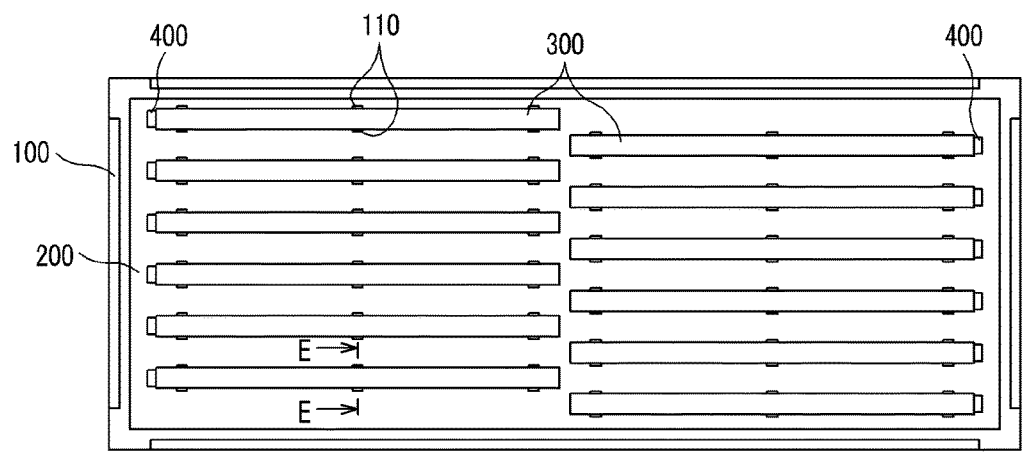
FIG. 15 is a view showing another embodiment of a backlight device on which a light guide bar of the present invention is mounted.
Figure 16A:
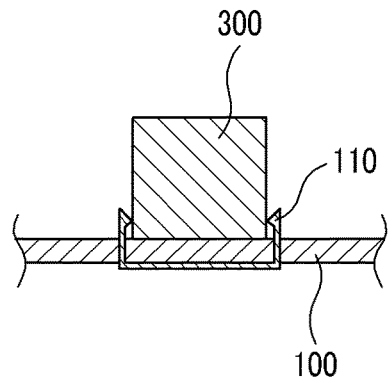
FIG. 16 is a view showing a fixing structure of the light guide bar of the present invention.
Figure 16B:
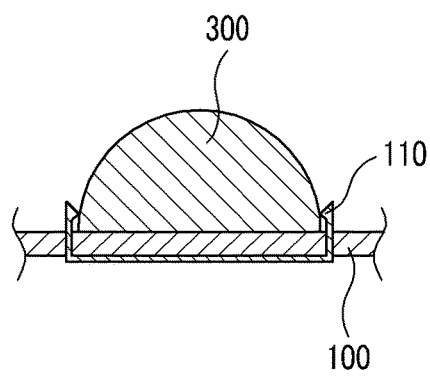

FIG. 15 is aview showing another embodiment of the backlight device on which the light guide bar of the present invention is mounted, and FIG. 16 is a cross-sectional view taken along line E-E, showing a fixing structure of the light guide bar of the present invention. A separation type light guide bar is applied to the backlight device of FIG. 15. Here, the pair of light guide main bodies 310 are disposed in a zigzag structure to become alternate on the same line in the longitudinal direction. Such a disposition structure is configured to more uniformly emit the light by supplementing an empty space between the neighboring light guide main bodies 310 of the other side at an end of the light guide main body 310 of one side.

The backlight device includes a fixing grip 110 configured to fix the light guide bar 300 into the cover bottom 100. As shown in FIG. 16, the fixing grip 110 presses both side sections of the light guide bar 300 to prevent horizontal and vertical movement of the light guide bar 300. The fixing grip 110 may be constituted by a pair of hooks, and may be integrally formed with the cover bottom 100 or separately formed to be fastened to the cover bottom 100.

Figure 17:
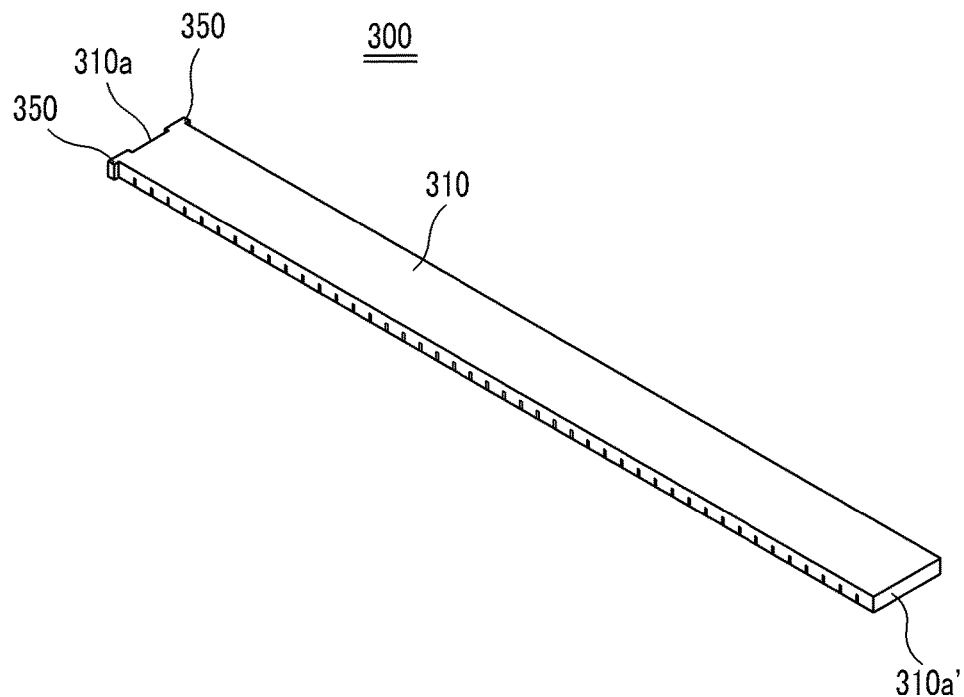
FIG. 17 is an enlarged perspective view showing a seventh embodiment of the light guide bar of the present invention.
Figure 18:
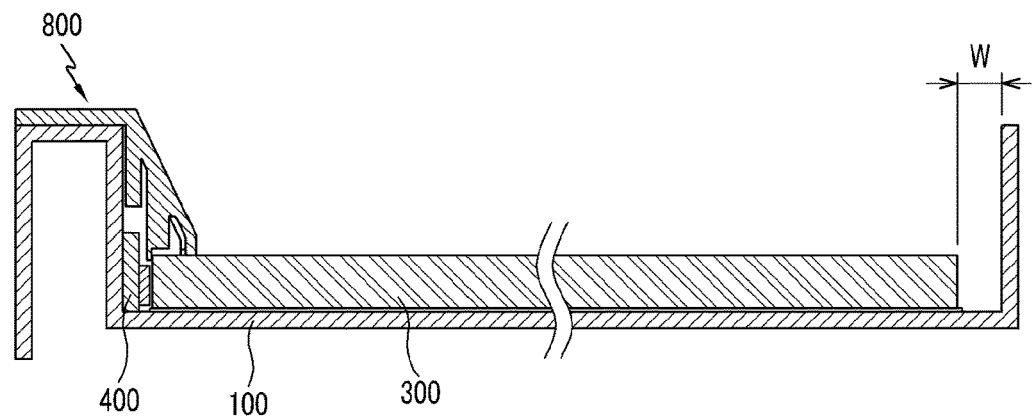
FIG. 18 is a longitudinal cross-sectional view schematically showing the backlight device including the light guide bar of FIG. 17.
Figure 19:
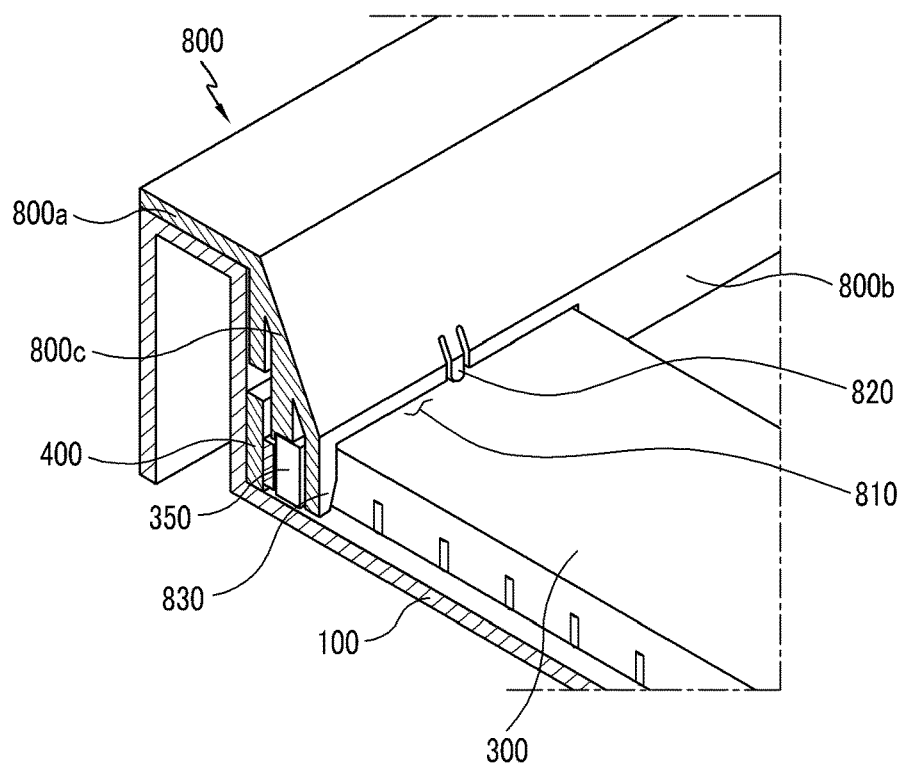
FIG. 19 is a partially enlarged view showing a fixing structure of the light guide bar of the backlight device of FIG. 18.

FIG. 17 is an enlarged perspective view showing a seventh embodiment of the light guide bar of the present invention, FIG. 18 is a longitudinal cross-sectional view schematically showing the backlight device including the light guide bar of FIG. 17, and FIG. 19 is a partially enlarged view showing a fixing structure of the light guide bar of the backlight device of FIG. 18. The light guide bar 300 of FIG. 17 has a hooking wing 350 formed at an end of a light incident surface side to be fixed to the cover bottom 100. The hooking wing 350 has ends of the light incident surface 310a side protruding from both sides of the light guide main body 310. As shown in FIG. 18, an end of the light guide bar 300 adjacent to the light incident surface 310a is fixed to the cover bottom 100 by the hooking wing 350, and an end adjacent to the pupillary light surface 310a' is assembled not to be restricted by the cover bottom while securing a predetermined gap W from a sidewall of the cover bottom 100. The light guide bar 300 is thermally expanded by the light totally reflected therein, a variation in light incident properties due to thermal expansion in the light incident surface 310a is prevented by the assembly structure, and the pupillary light surface 310a' becomes free from thermal expansion and deformation of the light guide bar 300 is prevented.

Here, as shown in FIG. 19, the light guide bar 300 adjacent to the light incident surface is fixed by the mold frame 800. The mold frame 800 may be constituted by a horizontal section 800a fastened to the cover bottom, a vertical section 800b configured to press the light guide bar 300, and a connecting section 800c configured to connect the horizontal section 800a and the vertical section 800b. Here, a groove section 810 into which an end of the light guide bar 300 is inserted is formed in the vertical section 800b. A pressing protrusion 820 is formed in the vertical section 800b of the upper surface of the groove section 810 to prevent vertical movement of the light guide bar 300. In addition, a hooking piece 830 is formed in the vertical sections 800b of both side surfaces of the groove section 810 to be engaged with the hooking wing 350 of the light guide bar 300 to prevent horizontal movement of the light guide bar 300. In particular, the hooking piece 830 can prevent movement due to thermal expansion of the light guide bar 300, and thus, an end of the light guide bar 300 adjacent to the light incident surface 310a can be stably fixed to the cover bottom 100.

Figure 20A:
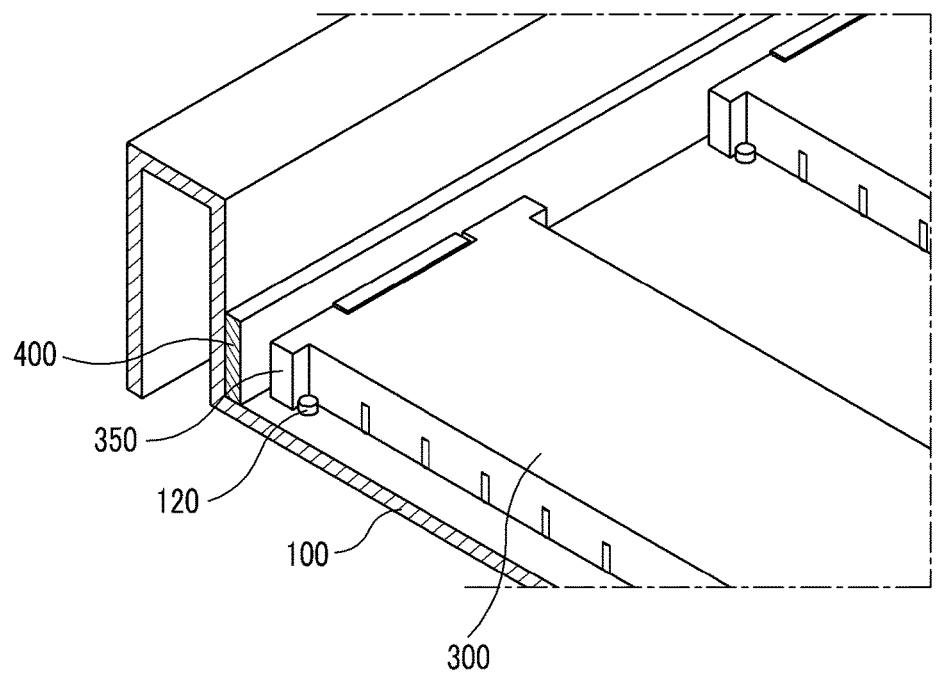
FIG. 20 is a partially enlarged view showing another embodiment of the fixing structure of the light guide bar of FIG. 18.
Figure 20B:
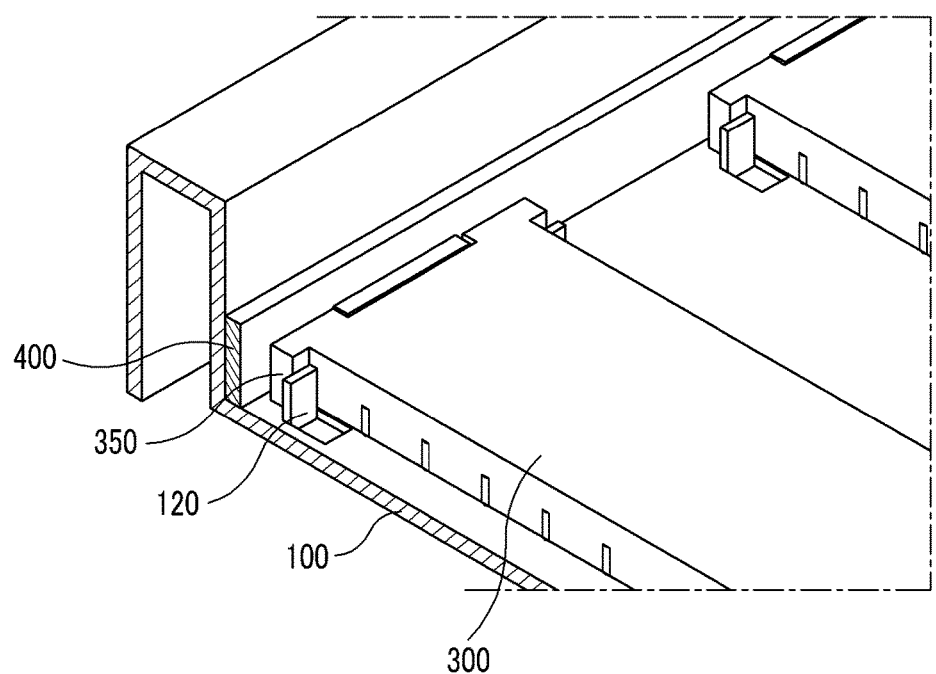

FIG. 20 is a partially enlarged view showing another embodiment of a fixing structure of the light guide bar. In the fixing structure of the light guide bar of FIG. 20, the light guide bar 300 is fixed to the cover bottom 100 by a hooking protrusion 120. The hooking protrusion 120 is formed on the cover bottom 100 at a position corresponding to the hooking wing 350 of the light guide bar 300. The hooking protrusion 120 may protrude in a columnar shape as shown in FIG. 20(a), or a part of a bottom surface of the cover bottom 100 may be cut to be bent upward as shown in FIG. 20(b). The hooking protrusion 120 may be engaged with the hooking wing 350 to fix the end of the light guide bar 300 adjacent to the light incident surface 310a to the cover bottom 100.

While the embodiments of the present invention having specific shapes and structures have been described with reference to the accompanying drawings, it will be apparent to those skilled in the art that various modifications and changes may be made without departing from the scope of the present invention.

REFERENCE SIGNS LIST

100: cover bottom 110: fixing grip
120: hooking protrusion 200: reflection surface
300: light guide bar 310: light guide main body
320: light reflection pattern 330: light extraction pattern
340: light source unit 350: hooking wing
311: extension section 312, 512: light scattering pattern
400: LED light source 500: diffusion plate
600: optical sheet 700: guide panel
800: mold frame

What is claimed is:
1. A light guide bar comprising:
a light guide main body having a bar shape with a certain length;
a light incident surface formed by at least one end of the light guide main body in a longitudinal direction such that light enters the light guide main body;
a reflection surface formed by a lower surface of the light guide main body to reflect light entering from the light incident surface into the light guide main body; and
a light emission surface formed by side surfaces and an upper surface of the light guide main body, the light emission surface configured to emit the light entering from the light incident surface and light reflecting from the reflection surface, to the outside of the light guide main body,
wherein a light extraction pattern for improving efficiency of the emitted light in the longitudinal direction is formed at the side surfaces of the light emission surface; and
wherein the light extraction pattern is controlled with respect to a surface curve of the light guide main body defined as

$$\frac{X^2}{a^2} + \frac{y^2}{b^2} = 1$$

(here, a and b are radii of a major axis and a minor axis),
an embossed light extraction pattern is controlled according to a surface curve by Mathematical Equation defined as $$\frac{X^2}{a_1^2} + \frac{(y+c_1)^2}{b_1^2} = 1$$

(here, $a_1 > a$, $b_1 > b$, and $c_1 > (b_1 - b) > 0$), and
an engraved light extraction pattern is controlled according to a surface curve by Mathematical Equation defined as $$\frac{X^2}{a_2^2} + \frac{(y+c_2)^2}{b_2^2} = 1$$

(here, $a_2 < a$, $b_2 < b$, and $c_2 > (b-b_2) > 0$).

2. The light guide bar according to claim 1, wherein the light guide main body has a cross-section in a progress direction of light formed in a quadrangular shape or a hemispherical shape.

3. The light guide bar according to claim 2, wherein the light guide main body is formed in a separation type in which a central section is separated.

4. The light guide bar according to claim 3, wherein the light guide main body has a plane formed at an end of the central section in a curved shape or a polygonal shape.

5. The light guide bar according to claim 3, wherein the light guide main body comprises:
- an extension section extending from an upper surface of an end of the central section;
- a space section provided under the extension section; and
- a light scattering pattern formed at an upper surface of the extension section.

6. The light guide bar according to claim 2, wherein the light extraction pattern is formed in a ring shape through embossing or engraving along a hemispherical shape of the light guide main body having a hemispherical shape cross-section.

7. The light guide bar according to claim 6, wherein the light extraction pattern has a shape having a size increased from a central section of an upper surface toward both side sections of the light emission surface.

* * * * *